(12) United States Patent
Murray et al.

(10) Patent No.: US 9,988,167 B2
(45) Date of Patent: Jun. 5, 2018

(54) POUCH PACKAGING MACHINE WITH THREE GRIPPERS

(71) Applicants: Pouch Pac Innovations, LLC, Sarasota, FL (US); SN Maschinenbau GmbH, Wipperfurth (DE)

(72) Inventors: R. Charles Murray, Sarasota, FL (US); Olaf Clemens, Wipperfurth (DE)

(73) Assignees: Pouch Pac Innovations, LLC, Sarasota, FL (US); SN Maschinenbau GmbH, Wipperfuerth (DE)

( * ) Notice: Subject to any disclaimer, the term of this patent is extended or adjusted under 35 U.S.C. 154(b) by 610 days.

(21) Appl. No.: 14/546,189

(22) Filed: Nov. 18, 2014

(65) Prior Publication Data
US 2015/0135651 A1    May 21, 2015

Related U.S. Application Data

(60) Provisional application No. 61/905,327, filed on Nov. 18, 2013.

(51) Int. Cl.
*B65B 43/32* (2006.01)
*B65G 29/00* (2006.01)
(Continued)

(52) U.S. Cl.
CPC ............. *B65B 43/32* (2013.01); *B65B 43/28* (2013.01); *B65B 43/465* (2013.01); *B65B 43/50* (2013.01);
(Continued)

(58) Field of Classification Search
CPC .......... B65G 47/847; B65G 2201/0238; B65G 29/00; B65B 43/32; B65B 43/28; B65B 43/465; B65B 43/50
(Continued)

(56) References Cited

U.S. PATENT DOCUMENTS 5,845,466 A * 12/1998 Laudenberg .......... B65B 43/465
                                                    53/384.1
7,584,593 B2    9/2009 Murray
(Continued)

FOREIGN PATENT DOCUMENTS

| KR | 101253510 B1 | 4/2013 |
|----|--------------|--------|
| RU | 2417928 C2   | 5/2011 |
| WO | 2011119923 A2 | 9/2011 |

OTHER PUBLICATIONS

International Search Report, Written Opinion of the International Searching Authority, PCT/US2014/066089, six pages.

*Primary Examiner* — Robert Long
*Assistant Examiner* — Xavier A Madison
(74) *Attorney, Agent, or Firm* — Dinsmore & Shohl LLP

(57) ABSTRACT

The present invention relates to machines and apparatuses for manufacturing and filling containers, specifically to machines and apparatus for transporting flexible pouches between manufacturing and filling stations with the ability to open and close the flexible pouch. The apparatus includes a movable base with a pair of side arms. Each of the side arms is movable between a first position and a second position. A center arm is attached to the base. The center arm is disposed between the pair of side arms. A gripping mechanism is disposed at an end portion of each of the side arms and the center arm. The pouches are moved between production stations by movement of the base. The present disclosure also includes a method for opening, closing, and moving a flexible pouch between one or more production stations.

11 Claims, 5 Drawing Sheets

(51) Int. Cl.
    *B65B 43/28*        (2006.01)
    *B65B 43/46*        (2006.01)
    *B65B 43/50*        (2006.01)
    *B65G 47/86*        (2006.01)

(52) U.S. Cl.
    CPC ............ B65G 29/00 (2013.01); *B65G 47/847* (2013.01); *B65G 2201/0238* (2013.01)

(58) Field of Classification Search
    USPC ................................................ 53/459, 384.1
    See application file for complete search history.

(56) References Cited

U.S. PATENT DOCUMENTS

| | | |
|---|---|---|
| 7,611,102 B2 | 11/2009 | Murray |
| 8,366,855 B2 | 2/2013 | Murray |
| 8,562,274 B2 | 10/2013 | Murray |
| 2012/0210675 A1* | 8/2012 | Murray ................. B65B 31/042 |
| | | 53/403 |

* cited by examiner

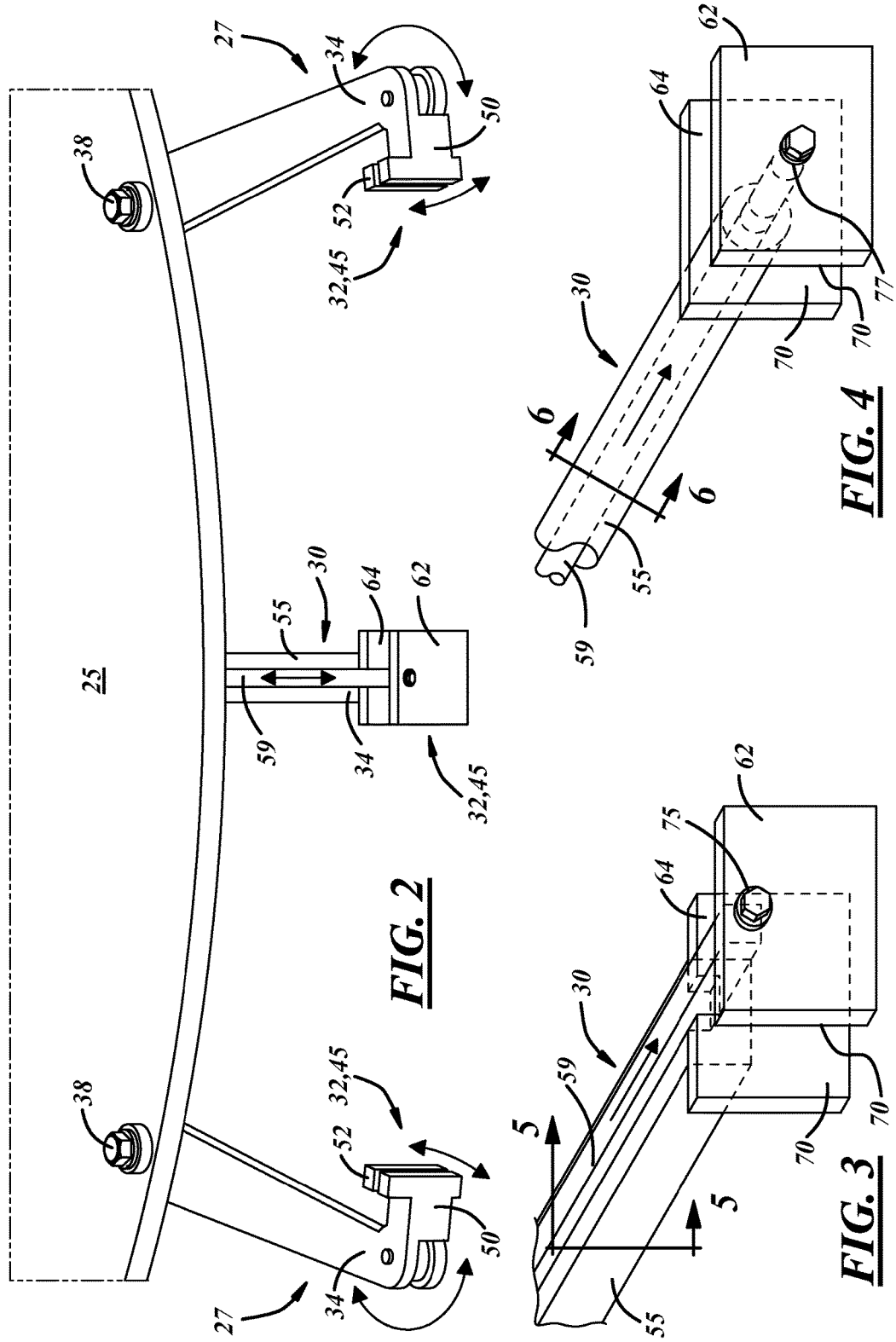

PATENT
POUCH PACKAGING MACHINE WITH THREE GRIPPERS

CROSS-REFERENCE TO RELATED APPLICATIONS

This application claims priority of U.S. Provisional Patent Application Ser. No. 61/905,327 filed on Nov. 18, 2013, which is incorporated herein by reference.

FIELD OF THE INVENTION

The present invention relates to machines and apparatuses for manufacturing and filling containers, specifically to machines and apparatus for transporting flexible pouches between manufacturing and filling stations with the ability to open and close the flexible pouch.

BACKGROUND OF THE INVENTION

Machines for transporting flexible pouches between manufacturing and filling stations are generally known. These machines typically include a pair of gripping arms that articulate towards and away from each other. The gripping arms grasp a flexible pouch at opposing ends of the pouch, the gripping arms moving towards each other to open the pouch and away from each other to close the pouch. Additionally, other means can be used to help assist in opening the pouch, for example a hot air knife or shot of compressed gas. The articulating arms are often attached to a turret or a conveyor type platform enabling the arms to be transitioned along with the pouch between various production stations. One known type of machine for opening and closing flexible pouches and moving them between stations can be found in U.S. Pat. No. 8,562,274 to Murray, incorporated herein by reference in its entirety.

Problems exist with the present designs of these types of machines insofar as it is difficult to open and close a pouch with multiple chambers. Further, clearance space must be included between each pair of articulating arms and its associated pouch and it is therefore necessary to provide for adequate space between each pouch for the articulation of the arms. This clearance space between each pouch requires a turret or conveyor system that is larger than perhaps necessary with a better design. The larger turret or conveyor system creates a larger footprint and decreases the efficient use of manufacturing space.

Based on the known machines and apparatuses and problems with the present art, a machine or apparatus that can open and close a flexible pouch with multiple chambers as well as having a decreased footprint compared to current designs is desired.

SUMMARY OF THE INVENTION

The object of the present invention is to provide a pouch packaging machine capable of holding pouches without requiring unnecessary articulation space between each pouch to decrease the overall machine size and footprint while increasing manufacturing flexibility. It is a further object of the present invention to provide a pouch packaging machine to hold pouches with various designs, for example a pouch having two chambers.

To solve the above-described problems an invention of the present disclosure is directed to an apparatus for moving a flexible pouch between production stations. The apparatus includes a movable base. Movably attached to the base is a pair of side arms. Each of the side arms is movable between a first position and a second position. A center arm is attached to the base. The center arm is disposed between the pair of side arms. A gripping mechanism is disposed at an end portion of each of the side arms and the center arm. The pair of side arms and center arm grip one or more flexible pouches with the flexible pouches being transitioned between an open condition and a closed condition by movement of the side arms between the first position and the second position. The pouches are moved between production stations by movement of the base.

The invention of the present disclosure also includes a method for opening, closing, and moving a flexible pouch between one or more production stations. The method includes the steps of providing a movable base with a center arm and a pair of side arms, the center arm having an end with a gripping mechanism, the side arms each having an end with a gripper mechanism, the side arms movable between a first and second position. The next step involves securing a flexible pouch to the center gripper mechanism and at least one of the side arm gripper mechanisms. After securing the flexible pouch, the base is moved to move the secured pouch to a first production station. A desired position of the side arm is determined based on the first production station, and finally the side arm is moved to the desired position.

Other features and advantages of the present invention will be readily appreciated, as the same becomes better understood after reading the subsequent description taken in conjunction with the accompanying drawings.

BRIEF DESCRIPTION OF THE DRAWINGS

FIG. 2 is a top perspective view of a portion of the turret style apparatus;

FIG. 3 is a perspective view of a center gripper arm;

FIG. 4 is a perspective view of an alternate embodiment of a center gripper arm;

DETAILED DESCRIPTION OF THE PREFERRED EMBODIMENTS

Figure 9:
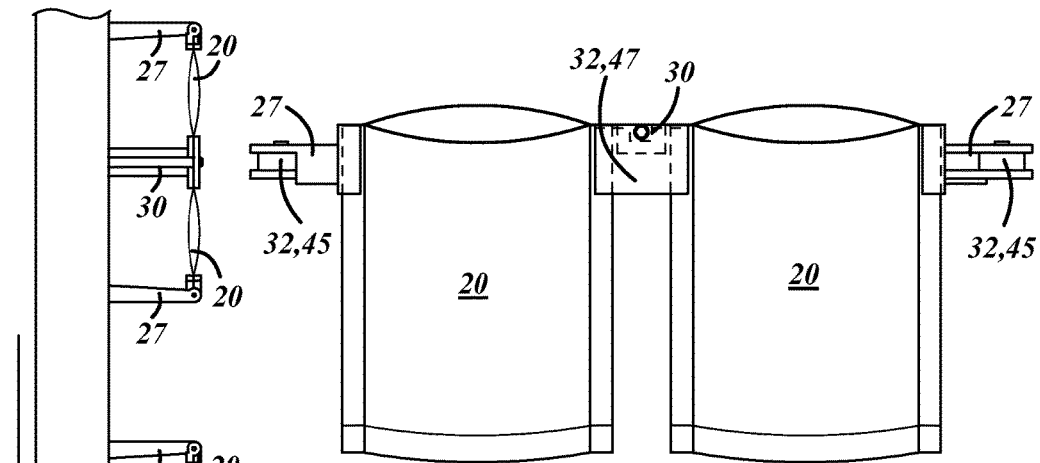
FIG. 9 is a front view of a pair of unjoined flexible pouches being gripped by a pair of side arms and a center arm.
Figure 10:
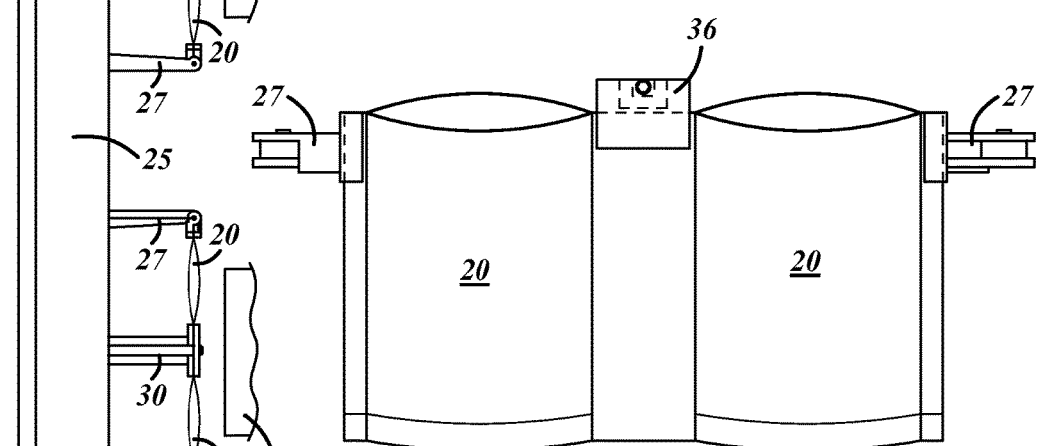
FIG. 10 is a pair of joined flexible pouches being gripped by a pair of side arms and a center arm.

The apparatus and method of the present disclosure enables a pair of flexible pouches 20 to be open, closed, and moved between production stations, with the apparatus having a smaller footprint than previous designs. The apparatus and method also enable alternate designs of pouches such as a multi-chambered pouches to be opened, closed, and moved between production stations. The pair of flexible pouches 20 may be two individual pouches 20 which are not joined together, as shown in FIG. 9. Alternately, the pair of flexible pouches may be two pouches 20 that are joined together, for example a multi-chambered pouch as shown in FIG. 10.

Figure 11:
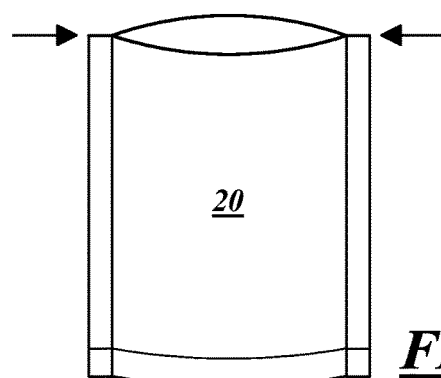
FIG. 11 is a front view of a flexible pouch in an open condition.
Figure 12:
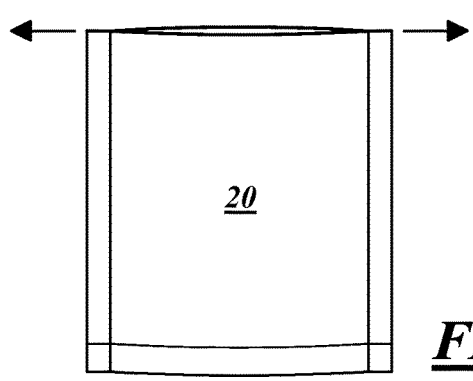
FIG. 12 is a front view of a flexible pouch in a closed position.

When a pair of pouches 20 that are not joined are used, machine space size, aka footprint size, is reduced with the apparatus of the present disclosure with the apparatus bringing edges of the flexible pouch 20 together to provide an open condition as shown in FIG. 11 and bringing the edges of the flexible pouch 20 away from a center of the flexible pouch 20 as shown in FIG. 12. The apparatus provides a smaller footprint by allowed pouches 20 to be located closer together, with articulation space only required on one side of the pouch 20.

Figure 13:
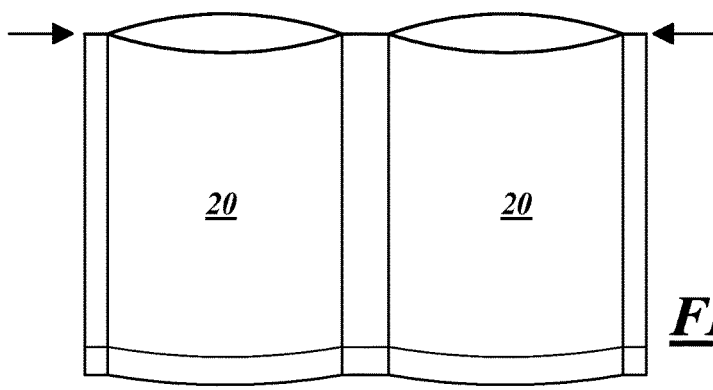
FIG. 13 is a front view of a pair of joined flexible pouches in an open condition.
Figure 14:
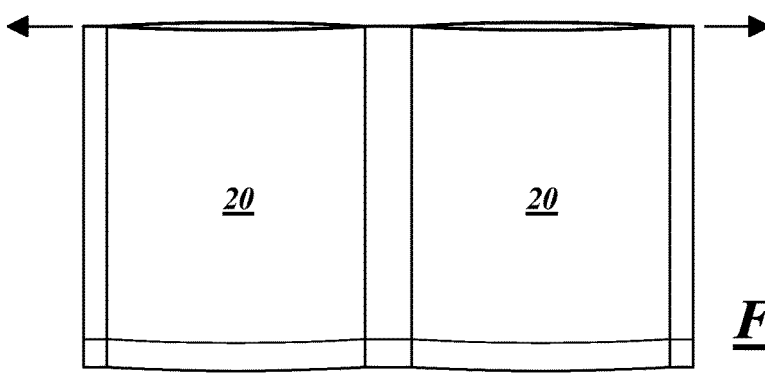
FIG. 14 is a pair of joined flexible pouches in a closed position.
Figure 15:
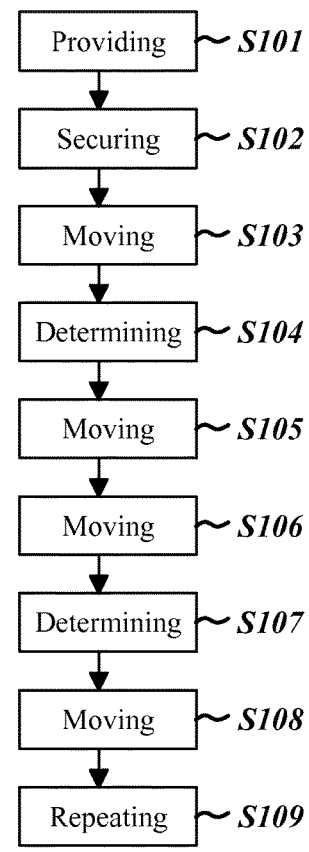
FIG. 15 is a flowchart illustrating the steps of a method of practicing the present invention.

When a pair of pouches 20 that are joined together, for example a multi-chambered pouch 20, is used, the apparatus provides stability to the area between the pair of joined pouches when the pouches 20 are placed into the open condition as shown in FIG. 13. Without the use of the disclosed apparatus, the center of the pair of joined pouches 20 would be left unsupported and movement of the edges towards each other to provide the open condition could prove problematic insomuch as the joined pair of pouches 20 would simply deform instead of opening. The pair of joined pouches 20 are placed into their closed configuration by pulling the edges apart, as shown in FIG. 14.

Various embodiments of an apparatus for moving a flexible pouch 20 between production stations 22 of the present disclosure are shown in FIGS. 1-10. The apparatus includes a movable base 25. A pair of side arms 27 is attached movably to the base 25. Each of the side arms 27 is movable between a first position and a second position. A center arm 30 is also attached to the base 25. The center arm 30 is disposed between the pair of side arms 27. A gripping mechanism 32 is disposed on an end portion 34 of each of the side arms 27 and the center arm 30. The pair of side arms 27 and center arm 30 grip one or more flexible pouches 20 to transition the flexible pouches 20 between an open condition and a closed condition by movement of the side arms 27 between the first position and the second position. The pouch 20 is moved between production stations 22 by movement of the base 25.

The production stations 22 may be used for a variety of purposes in the manufacturing of a flexible pouch 20. Examples of different production station 22 types include a loading station, a purging station, a filling station, a fitment insertion station, a top seal station, an unloading station, etc. The pouch 20 is typically moved though the production stations 22 in a specific order, for example by starting at a first production station 20a, moving to one or more next production stations 20b, and ending at a final production station 20c.

Figure 1:
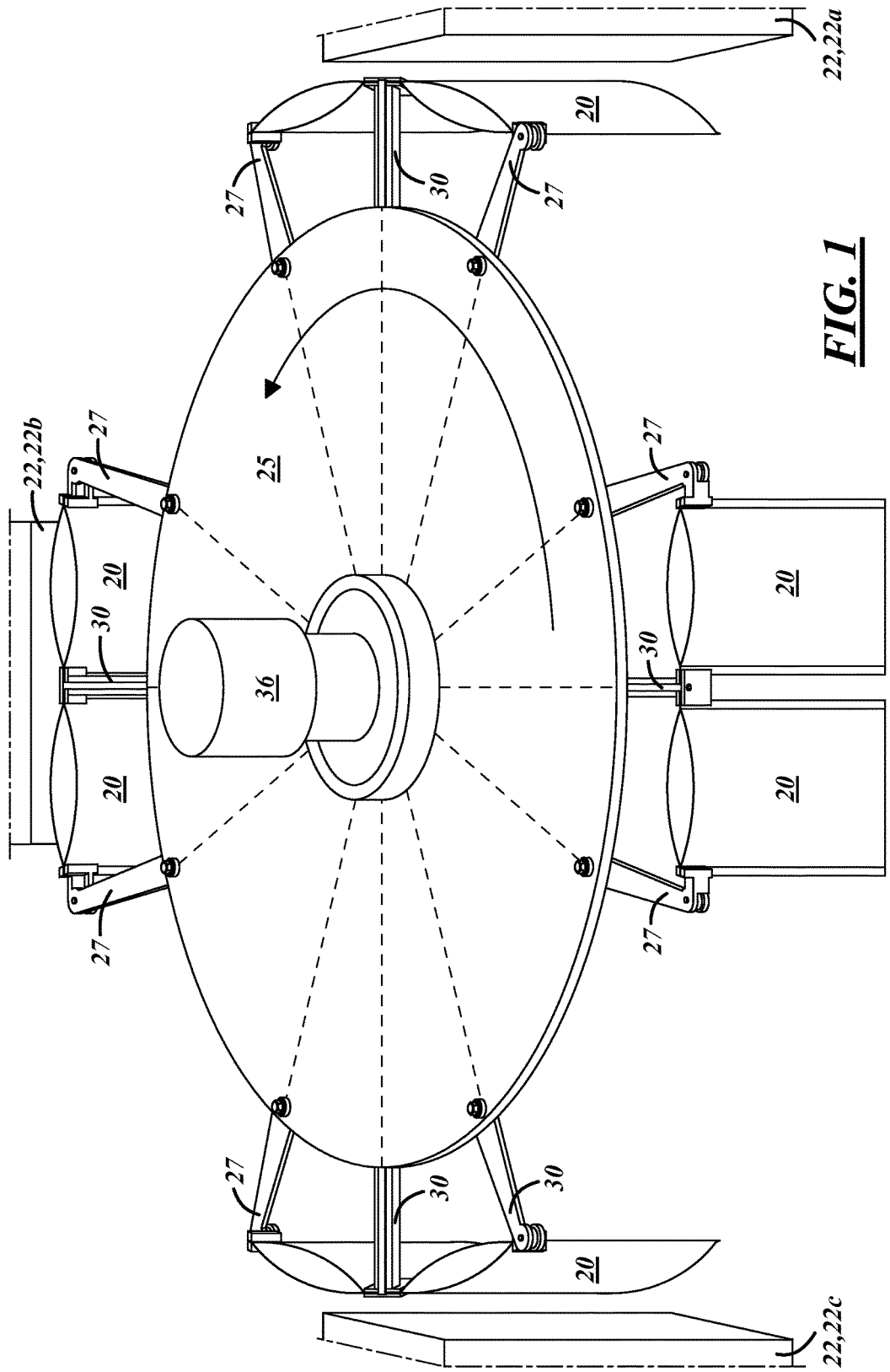
FIG. 1 is a top perspective view of a turret style apparatus of the present invention.

The movable base 25 may include various alternate designs. For example, the movable base 25 may have a turret style design as shown in FIG. 1. The turret style design rotates about its center 36 of the movable base 25. The turret style design provides movement by rotation of the movable base 25 shown in FIG. 1. The turret style design moves the flexible pouches 20 between production stations 22 laid out in a generally circular pattern.

Figure 8:
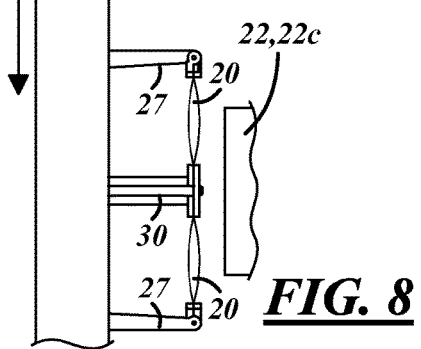
FIG. 8 is a top elevation view of a linear style design of an apparatus of the present invention.

An alternate design of the movable base 25 includes a linear style design shown in FIG. 8. The linear style design of the movable base 25 provides movement of the flexible pouches 20 between production stations 22 by translation of portions of the movable base 20. Various types of linear style movable bases 25 include conveyor belt type systems which can double back over themselves with a roller, or systems that circulate in various patterns when viewed from the top. The common feature of the linear style movable bases 25 being that for at least a portion of the movement of the base 25 and the associated flexible pouch 20, the movement is done in a straight line.

Figure 7:
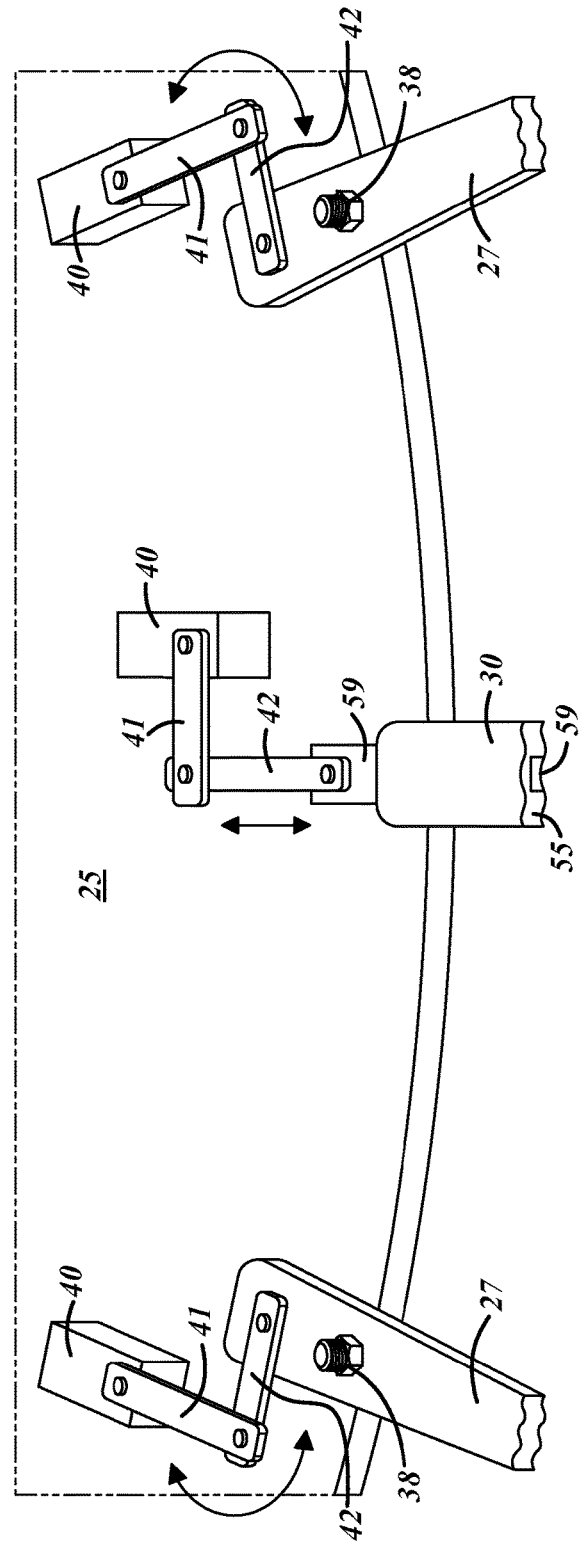
FIG. 7 is a bottom perspective view of a portion of the turret style design apparatus of FIG. 1.

The pair of side arms 27 may be movably attached to the base 25 to pivot between a first position and a second position through the use of a bolt 38, the bolt 38 providing a pivot point between the side arm 27 and the base 25. To enable movement of the side arm 27 between the first position and the second position, a servo 40 may be used in combination with a servo arm 41 and a servo linkage 42 as shown in FIG. 7. Other methods may be used to transition the side arm 27 between the first position and the second position such as various hydraulic and mechanical systems known to those skilled in the art. For example and illustration only, one such system can be found in U.S. Pat. No. 8,562,274 to Murray, incorporated herein by reference in its entirety.

When a turret style design is used as shown in Figure, the center arm 30 extends generally radially from the movable base 25. Alternately, when a linear style movable base design is used, the center arm 27 extends generally perpendicularly from the movable base 25. The center arm 30 is disposed between the side arms 27, and is secured to the movable base 25 by way of welding, fastening, integrally forming, or any other method known to those skilled in the art such that the center arm 27 is rigidly secured to the base 25 to prevent motion there between.

The gripping mechanism 32 is disposed at the end portion 34 of each of the side arms 27, and the center arm 30. The gripping mechanism 32 may be provided with alternate designs, for example a pinch mechanism 45 and a clamp mechanism 47.

The pinch mechanism 45 can be seen in FIG. 2. The pinch mechanism 45 as shown is disposed at the end of each of the side arms 27. The pinch mechanism includes a first pinching member 50 and a second pinching member 52. The first pinching member 50 is pivotally coupled to the second pinching member 52. The first pinching member 50 rotates relative to the second pinching member 52 to provide an open position and a closed position, the open position used to release the flexible pouch 20 and the closed position used to secure the flexible pouch 20. It is understood and appreciated that, alternatively, the second pinching member 52 may rotate relative to the first pinching member 50.

Movement of the pinch mechanism 45 to provide the open position and the closed position may be done with an electric motor and pulley system, hydraulic system, or other mechanical system known to those skilled in the art. One such example can be found in U.S. Pat. No. 8,562,274 to Murray, incorporated herein by reference in its entirety.

The clamp mechanism 47 of the shown embodiments is used with the center arm 30. The center arm 30 includes a main portion 55, a channel 57, and an articulating portion 59. As shown in FIGS. 2-6, the articulating portion 59 is disposed within the channel 57 and slides therein between a first position and a second position. The clamping mechanism 47 is disposed at the end portion 34 of the center arm 30.

The clamping mechanism 47 has a first clamping member 62 and a second clamping member 64. The first clamping member 62 is secured to the articulating portion 59 and the second clamping member 64 is secured to the main portion 55. Sliding of the articulating portion 59 within the channel 57 between the first and second positions provides movement of the first clamping member 62 relative to the second clamping member 64 thereby giving the clamping mechanism an open position and a closed position to grasp or release the flexible pouch 20. As shown in FIG. 7, the articulating portion 59 may be slid within the channel 57 by the use of a servo 40 with an associated servo arm 41 and linkage 42. Other means may be used for sliding the articulating portion 59 within the channel 57 such as various hydraulic systems, mechanical systems such as a rack and pinion setup, or any other method known to those skilled in the art.

Figure 5:
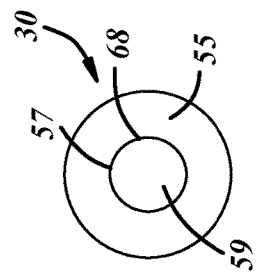
FIG. 5 is a cross sectional view of the center arm of FIG. 3.

As shown in FIGS. 3 and 5, the main portion 55 of the center arm 30 may have a generally extruded rectangle shape. The channel 57 may be located along a top surface 66 of the main portion 55. Providing the channel 57 along the top surface 66 allows for easy access to the articulating portion 59, should maintenance on the apparatus need to be performed. Providing a generally rectangle shape to the center arm 30, the channel 57, and the articulating portion 59 helps provides a stability to the center arm 30 and decreases the potential of the various components rotating relative to each other.

Figure 6:
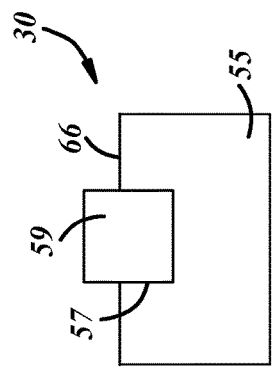
FIG. 6 is a cross sectional view of the center arm of FIG. 4.

Alternately, the center arm 30 may be generally cylindrical in shape as shown in FIGS. 4 and 6. The channel 57 can also be circular in nature and located down a center 68 of the main portion 55. Locating the articulating portion 59 in a channel 57 that is disposed down the center 68 of the main portion 55 provides a protection to the articulating portion 59. Providing a generally cylindrical shape to the main portion 55, the channel 57, and articulating portion 59 provides an easy assembly of various components without requiring specific orientation of one component relative to another.

The first clamping member 62 and second clamping member 64 include a pouch contacting surface 70. The pouch contacting surface 70 may have a generally rectangular profile 72. As shown in FIG. 3, the articulating portion 59 may be secured to the first clamping member 62 near an edge 75 of the first clamping member 62 and center clamping member 62. Alternately, the articulating portion 59 may be secured to the first clamping member 62 near a center 77 of the pouch contacting surface 70.

A method for opening, closing, and moving a flexible pouch between one or more production stations of the present disclosure includes the following steps. At step S101 a movable base with a center arm and a pair of side arms is provided, the center arm having an end with a gripping mechanism and the side arms each having an end with a gripping mechanism. The side arms being movable between a first and second position. At step S102 a flexible pouch is secured to the center arm grip mechanism and at least one of the side arm gripping mechanisms. At step S103 the base is moved to move the secured pouch to a first production station. At step S104 a desired position of the side arms based on the first production station is determined, and at step S105 the at least one side arm is moved to the desired position.

Securing the flexible pouch to the center arm and at least one side arm may be achieved by opening the relative gripping mechanisms, positioning the flexible pouch within the gripping mechanism, and then closing the gripping mechanism. At step S103 movement of the base may be achieved by rotating the base or translating the base as described above. At step S104 the determination of the desired position of the at least one side arm can be made based on the type of station the flexible pouch is at. For example, if the flexible pouch is at a filling station and product is desired to be inserted into the pouch, then the pouch should be in an open condition. For an open condition the side arm should be in a position closer to the center arm as compared to the closed position where the side arm would be farther away. An example of a station needing a closed position would be a sealing station to seal the flexible pouch closed. After the flexible pouch has been moved to the first production station and the side arms placed in their desired position, the base may then be moved again to move the pouch to a next production station where the determination of the appropriate position of the side arms and following movement of the side arms to their desired position is repeated, steps S106, S107, and S108. The steps S106 to S108 may be repeated until the pouch has traveled through all desired production stations with the final production station, step S109.

The present invention has been described in an illustrative manner. It is to be understood that the terminology which has been used is intended to be in the nature of words of description rather than of limitation.

Many modifications and variations of the present invention are possible in light of the above teachings. Therefore, the present invention may be practiced other than as specifically described.

The invention claimed is:

1. An apparatus for moving a flexible pouch between production stations comprising:
   a moveable base;
   a pair of side arms movably attached to the base, each of the side arms movable between a first position and a second position;
   a center arm attached to the base, the center arm disposed between the pair of side arms;
   the center arm including a main portion, a channel, and an articulating portion, the articulating portion disposed within the channel, and the articulating portion sliding within the channel;
   a gripping mechanism disposed on an end portion of each of the side arms and the center arm, the gripping mechanism disposed at the end portion of the center arm being a clamp mechanism, the clamp mechanism having a first clamping member secured to the articulating portion and a second clamping member secured to the main portion; wherein sliding of the articulating portion provides the clamp mechanism with an open position and a closed position to grasp or release the flexible pouch.

2. The apparatus of claim 1 further comprising:
   the gripping mechanism disposed at the end of each side being a pinch mechanism, the pinch mechanism having a first pinching member and a second pinching member, the first pinching member pivotally coupled to the second pinching member, the first pinching member rotatable relative to the second pinching member;
   wherein rotation of the first pinching member provides the pinch mechanism with an open position and a closed position to grasp or release the flexible pouch.

3. The apparatus of claim 1 further comprising:
   the first clamping member and the second clamping member each including a pouch contacting surface, the pouch contacting surface having a generally rectangular profile.

4. The apparatus of claim 1 wherein the channel is located along a top surface of the main portion.

5. The apparatus of claim 1 wherein the channel is located down a center of the main portion.

6. The apparatus of claim 1 wherein the center arm is generally cylindrical in shape.

7. The apparatus of claim 1 wherein the center arm has a generally extruded rectangle shape.

8. The apparatus of claim 1 wherein the articulating portion is secured to the first clamping member near an edge of the first clamping portion.

9. The apparatus of claim 1 wherein the articulating portion is secured to the first clamping member near a center of the first clamping portion.

10. The apparatus of claim 1 further comprising:
    the movement of the base being rotational;
    wherein in the rotation of the base allows movement of the flexible pouch between stations that are laid out in a generally circular pattern.

11. The apparatus of claim 1 further comprising:
    the movement of the base being translational;
    wherein the translation of the base allows movement of the flexible pouch between stations that are laid out in a generally linear pattern.

* * * * *